United States Patent
Hattori

(10) Patent No.: US 7,602,532 B2
(45) Date of Patent: Oct. 13, 2009

(54) HIGHLY ACCURATE AND RAPID SCANNING BY A SIMPLE SCANNING DEVICE AND COLOR CORRECTION TECHNOLOGY FOR A PRINTING DEVICE

(75) Inventor: Toshiyuki Hattori, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1043 days.

(21) Appl. No.: 11/076,354

(22) Filed: Mar. 8, 2005

(65) Prior Publication Data

US 2005/0206982 A1 Sep. 22, 2005

(30) Foreign Application Priority Data

Mar. 9, 2004 (JP) ............... 2004-065114

(51) Int. Cl.
- G06K 15/00 (2006.01)
- H04N 1/04 (2006.01)
- G03F 3/08 (2006.01)

(52) U.S. Cl. ............ 358/3.23; 358/474; 358/1.9; 358/523

(58) Field of Classification Search ........... 358/1.1, 358/1.6, 474, 475, 1.9, 3.23, 1.17, 504, 505, 358/509, 520, 521, 522, 523, 532
See application file for complete search history.

(56) References Cited

U.S. PATENT DOCUMENTS

| | | | |
|---|---|---|---|
| 5,856,876 A * | 1/1999 | Sasanuma et al. ......... 358/300 |
| 5,956,015 A * | 9/1999 | Hino ..................... 345/600 |
| 2002/0036696 A1* | 3/2002 | Takemoto ................ 348/223 |
| 2002/0159083 A1* | 10/2002 | Arai et al. ................. 358/1.9 |
| 2003/0142110 A1* | 7/2003 | Murashita ................ 345/600 |
| 2004/0125983 A1* | 7/2004 | Reed et al. ................ 382/100 |
| 2004/0131371 A1* | 7/2004 | Itagaki et al. .............. 399/49 |
| 2004/0190770 A1* | 9/2004 | Spaulding et al. .......... 382/167 |
| 2005/0157346 A1* | 7/2005 | Kitagawara et al. ......... 358/2.1 |

FOREIGN PATENT DOCUMENTS

| | | |
|---|---|---|
| JP | 07-193711 | 7/1995 |
| JP | 08-065458 | 3/1996 |

OTHER PUBLICATIONS

Abstract of Japanese Patent Publication No. 07-193711, Pub. Date: Jul. 28, 1995, Patent Abstracts of Japan.
Abstract of Japanese Patent Publication No. 08-065458, Pub. Date: Mar. 8, 1996, Patent Abstracts of Japan.

* cited by examiner

*Primary Examiner*—Jerome Grant, II
(74) *Attorney, Agent, or Firm*—Martine Penilla & Gencarella, LLP

(57) ABSTRACT

A scan target is scanned to acquire scan data that includes tone values for each color component in a plurality of pixels; there are acquired scan profiles indicating association relationships between the aforementioned tone values and color values, which profiles specify a said association relationship for each of a plurality of scan locations in the aforementioned image scanning program code; and for scan data acquired by means of the aforementioned image scanning step, the aforementioned tone values are converted to color values with reference to the scan profile corresponding to each scan location.

13 Claims, 11 Drawing Sheets

HIGHLY ACCURATE AND RAPID SCANNING BY A SIMPLE SCANNING DEVICE AND COLOR CORRECTION TECHNOLOGY FOR A PRINTING DEVICE

BACKGROUND OF THE INVENTION

1. Field of the Invention

The present invention relates to technology for improving scanning accuracy of a scanning device so as to enable use in color correction of a printing device.

2. Description of the Related Art

In recent years, flatbed scanners and other image scanning devices affording high resolution at very low cost have become widespread. While such flatbed scanners offer increasingly higher resolutions, improvements in color scanning accuracy have not kept pace. Specifically, in flatbed scanners, scanning error among individual devices or error due to placement of the document being scanned on the original stage can occur, and it is difficult to effectively eliminate such errors. While technologies to improve scanning accuracy have been disclosed (e.g. Unexamined Patent Application 7-193711), these have not proven satisfactory in situations where extremely high accuracy of measurement is required.

SUMMARY OF THE INVENTION

In flatbed scanners and similar image scanning devices, while it is possible to scan numerous images all at one time, measurement with high accuracy is difficult as noted previously. Accordingly, there was a need for a device able to scan a large number of images rapidly, while scanning with high accuracy. For example, during production of printing devices it is common practice to perform color matching so that output of individual manufactured devices is the same as output from a predetermined standard device, and such color matching requires a highly efficient operation and high accuracy of measurement.

Specifically, during production of printing devices, there is first created a color conversion table for output of desired colors in a predetermined standard device, and this color conversion table is utilized in individual devices as well, to print a large number of patches. The printed output is measured for color values, and if output color should differ from that of the standard device, correction is performed to compensate for the discrepancy in the individual device.

When measuring output color of an individual device, a colorimeter that can measure color values correctly is used, but in colorimeters to date the surface area that can be measured at one time was fairly small, making them unsuited to use in volume production of printing devices. Specifically, it was extremely time consuming to print out a plurality of patches with each individual device and perform color measurement thereof with the colorimeter, making it difficult to improve production efficiency. With a flatbed scanner or the like, on the other hand, while a large number of patches can be measured all at one time, extremely accurate measurement is necessary for the purpose of carrying out color matching, and in the prior art technology described previously, it was not possible to assure the accuracy needed for color matching, even when differences for each location were averaged.

With the foregoing in view, it is an object of the present invention to provide technology for scanning large quantities of images rapidly and with high accuracy.

To achieve the stated object, in the present invention, scan data is converted to color values on the basis of a scan profile for each of a plurality of scan locations. Specifically, in an arrangement wherein the image scanning process a scanning target is scanned and tone values for each color component are acquired, even if the scanning target is of the same given color, errors in scan data by scan location can be produced due to various factors such as sensor arrangement and characteristics. Accordingly, by preparing in advance a scan profile for each scan location, error at each scan location can be assimilated, making it possible to acquire color values accurately at each scan location. By creating such scan profiles for each individual image scanning device, it is possible also to assimilate error among individual devices, to acquire accurate color values.

Here, in image scanning it suffices to be able to scan the scan target, and acquire scan data that represents pixels through tones for each color component. For example, it is possible to employ an arrangement whereby the scan target is illuminated with a predetermined illuminant, the reflected light is received by a sensor such as a CCD, and scan data corresponding to received light intensity by the sensor is acquired. The color components may be any one or more color components. That is, where a monochrome scan is carried out, lightness may be acquired by way of the color component, whereas in the case of a color scan, color may be represented by a plurality of color components of chromatic color. Where tone values are to be acquired for each color component of chromatic color, it is possible to employ any of various arrangements, such as an arrangement in which an RGB (red, green, blue) or CMY (cyan, magenta, yellow) color filter is disposed in front of the CCD or other sensor, and tone values of each color component are acquired.

The present invention can be implemented in all manner of image scanning in which discrepancy in scanning characteristics can occur at each location at which scanning is performed. In a mode in which a scanning characteristics target is placed on the original stage and a two-dimensional scan target is scanned two-dimensionally, discrepancy tend to occur at each scan location, making implementation of the invention highly desirable. Of course, the invention could also be implemented in image scanning that involves one-dimensional scanning or three-dimensional scanning.

Various sensor arrangements are possible in image scanning, it being acceptable to have sensors placed two-dimensionally, or to carry out two-dimensional scanning by means of a one-dimensional sensor (line sensor) that moves relative to the scan target. Where two-dimensional scanning is carried out, in preferred practice scan locations will be identified two-dimensionally, and a scan profile created for each scan location. However, in an arrangement employing a moving one-dimensional sensor as mentioned above, higher accuracy can be achieved by identifying scan locations at least one-dimensionally, and creating a scan profile for each scan location. In the latter case, scan profile creation workload and required resources can be kept to a minimum, and as such can be employed as a preferred mode depending on required scan accuracy.

Scan data acquired in an image scan reflects intensity of light received by the aforementioned sensors, and as such represents device-dependent color. In an image scanning device, since scan data is device-dependent color, the aforementioned scan profile is utilized to effect conversion to color values enabling objective identification of color. Accordingly, it suffices for color values in the present invention to be values that identify color in a device-independent color space that objectively identifies color. As such a device-independent color space, there could be employed, for example, the L*a*b* space, the L*u*v* space, the XYZ space, or the like.

In a scan profile it suffices that a discrete profile be defined for each scan location in an image scan; scan location can be defined by a variety of methods. For example, it would be possible to employ an arrangement wherein a predetermined coordinate system is defined for an image scan, and locations identified as coordinates therein. Of course, it would also be acceptable to define a predetermined planar area for each scan location, and assuming common scan characteristics for the scan target within the planar area, to convert scan data thereof into color values using a common scan profile.

In any event, it is sufficient to be able to specify a scan profile for each scan location, by means of associating scan profiles with scan locations defined by any of various methods. In order to be able to acquire scan profiles, it suffices to create in advance a scan profile for each scan location, and to store these in a predetermined storage medium etc. so as to enable identification of the scan location of each scan profile.

In each scan profile, it suffices to be able to associate the aforementioned tone values and color values with one another; a LUT that specifies one-to-one relationships of tone values and color values for a plurality of representative points would be acceptable, as would profiles that specify color relationships by means of a predetermined function or matrix. In the color value acquisition process, it suffices, in the former example, to be able to convert any tone value to a color value by means of an interpolation calculation, and in the latter example to be able to convert any tone value to a color value by means of a function or matrix. Of course, in this color value acquisition process, scan locations in the scan data are identified and conversion is carried out with reference to the profile corresponding to each scan location.

Color values identified by scan profiles can employ any of various color spaces such as those mentioned previously; the number of color components to be identified as profiles can be modified appropriately depending on the required accuracy level and particular purpose. Specifically, in instances where scanning is to be carried out with exceptionally high accuracy, and it is desired to identify scanned color per se, it would be acceptable to identify by means of the profile all of the color components that make up the color space, e.g., the $L^*$ component, the $a^*$ component, and the $b^*$ component in the case of the $L^*a^*b^*$ space.

In instances where, on the other hand, scanning with high accuracy is to be realized by means of a simple arrangement, it would be acceptable to employ an arrangement whereby any or some of the color components making up the color space that indicates color values are utilized. For example, where pixel color is represented by tone values of each of a plurality of color components in scan data, with the color space indicating color values being made up of a plurality of color components, any of the color components can be associated with any of the aforementioned color values in the aforementioned scan profile. That is, one-dimensional tone values are associated with one-dimensional color values.

In this way, where some of a plurality of color components are used to acquire correct color values for each scan location, in the event that some of the color components of scan data are specific tone values, it is possible to correctly determine that at least a specific color component of a tone value is a specific value. That is, even if not all of the color components of a scanned color can be identified, nevertheless, a specific color component of a color value can be identified correctly without any effect on scanning error dependent on the scanning device.

In this way, in certain instances ample usefulness as an image scanning device is afforded by means of being able to scan rapidly and with high accuracy, even with only a specific color component of color values. For example, when matching output color of an individual printing device to that of a standard device, there are instances in which deviation in output color of the standard device and an individual device are detected with a specific color component. That is, calibration can be carried out by compensating for color difference in a specific color component of the color values.

Accordingly, in such instances, it suffices to be able to correctly scan the specific color component of the color values. More specifically, where scan data is composed of RGB tone values, the scan profile may be arranged associating $L^*$ with any of tone value RGB. Of course, the target specified by the scan profile is not limited to this example, it being acceptable to associate either $a^*$ or $b^*$ with any value RGB; it is moreover acceptable not only to associate one-dimensional tone values with one-dimensional color values, but also to associate n-dimensional tone values with m-dimensional color values (where n and m are integers equal to 2 or greater).

Scan profiles may be created in advance; by way of example of a suitable method for doing so, it is possible to employ an arrangement wherein scan profile is created on the basis of a plurality of known standard color sheets. Specifically, there are prepared a plurality of sheets having a single color on the surface of each sheet, but with the plurality of sheets having different colors from one another; a location is identified on each sheet, and color value thereof is measured. At this time, a colorimeter or the like capable of conducting measurement with high accuracy is used for measurement. As a result, there can be obtained a plurality of standard color sheets with different color values, whose color value at each location is known.

Thus, by scanning this plurality of standard color sheets, scan data that includes scan location error and device error in each image scanning device can be acquired, and by associating the tone values of the scan data with the aforementioned known color values, a scan profile can be created. The reason for preparing a plurality of standard color sheets is for the purpose of associating a plurality of color values and tone values by means of image scanning for different color values.

That is, it suffices that by associating a plurality of color values and tone values, it is possible to calculate a color value corresponding to any tone value by means of an interpolation calculation or the like. Of course, since in scan profiles it suffices to be able to specify an association relationship of color values and tone values for each scan location, even with an arrangement such that a plurality of colors with different color values are recorded for a single sheet, and desired color is scanned at a desired scan location while moving the sheet per se, it is nevertheless possible to create the scan profile. However, by using a plurality of standard color sheets as described previously, it is possible to read a sheet all at once without moving it, making it possible to easily create a scan profile.

The image scanning device hereinabove is favorably used as a color correction device for compensating for color deviation in a printing device. As a specific example of an arrangement thereof, it is possible to employ an arrangement whereby a plurality of patches are printed on the basis of image data that differs for each location corresponding to the aforementioned scan location, and to then scan the patches with the image scanning device of the invention. That is, in order to perform calibration of the printing device, a plurality of patches are printed on the basis of different image data in the printing device (data in which tone values specifying pixel color differs).

At this time, locations for printing patches are associated with the aforementioned scan locations. As a result, by scanning this plurality of patches with the aforementioned image scanning device, it becomes possible to acquire correct color values for each patch. If correct color values can be acquired for each patch, it becomes possible to acquire the color difference between the acquired color value in question and color indicated by the aforementioned image data (i.e. color that should be output by the standard printing device).

Correction data for the purpose of compensating for this color difference can be data able to correct any image data on the basis of the correction data, as a result affording color deviation-compensated output; any of various arrangements could be employed. For example, if on the basis of a plurality of image data, patches can be printed by an individual device targeted for calibration, and the color values thereof obtained, it is then possible, on the basis of the trend of change of color values with respect to the image data, to derive image data needed by an individual device in order to output any color value. On the other hand, color that should be output by image data will be the output color obtained when printing is carried out with a standard printing device, on the basis of the image data in question.

Accordingly, in an individual device, it suffices to define carrying out of correction according to a predetermined rule such that output color in the instance of printing on the basis of correction image data coincides with the color that should be output by this image data, and to generate correction data for the purpose of carrying out correction according to this rule. More specifically, there may be employed a correction function for the purpose of correcting tone values of image data; a function dependent on tone value, which function outputs corrected data depending on input of tone values; or the like.

In the preceding manner, by utilizing the image scanning device pertaining to the invention for color measurement when carrying out calibration of a printing device, it is possible to generate correction data while correctly scanning a large number of patches all at one time. Accordingly, operation efficiency during mass production of printing devices can be increased exceptionally. In preferred practice, when carrying out calibration of printing devices, the standard color sheets described above will be printed out with the calibration target printing device under the same conditions as during calibration.

Specifically, where printouts having identical spectral distribution characteristics can be printed both with ink used when printing patches with individual printing devices and with ink used when recording standard color sheets when creating a scan profile, characteristics of change in color value with respect to change in image data tend to resemble one another, whereby it becomes possible to readily create correction data. Further, if the scan profile is created on the basis of standard color sheets printed with ink and printing conditions identical to the ink and printing conditions used when printing calibration patches with an individual printing device, the gamut of the two will be identical as well. Where a sheet with different gamut, such as a commercially available sheet for example, is used, conditions such as inclusion of out-of-gamut colors for the printing device, or failure to include adequate color to provide coverage of the gamut, may occur. However, where common ink and printing conditions (.e.g. printing medium etc.) are used for a common gamut as described above, operations can be carried out efficiently without wasted effort or excess and deficiency.

Where the image scanning device is utilized for calibration of a printing device, the scan profile can be composed even more simply. Specifically, since for patches printed with the printing device targeted for calibration, locations of patches and the image data thereof can be determined in advance, the profile sufficient to measure the patch can differ for each location. Accordingly, a profile sufficient to measure a patch, for example, a profile limited to data in proximity to tone values that can be assumed as patch scan data, could be constructed.

As a preferred example of an arrangement for carrying out calibration using a specific color component of color values, it would be acceptable devise an arrangement whereby scan profiles associating one-dimensional tone values with one-dimensional color values as described previously are prepared, and patches are printed with ink monochrome in the printing device. That is, where a plurality of patches are printed while varying in stepwise fashion the ink usage level of a specific color, a specific color component of color values can be made to vary appreciably, while the other color components vary to a lesser degree.

Thus, in a scan profile, by specifying an association relationship of tone values and color values for a specific color component that varies appreciably, it becomes possible to carry out calibration with sufficient accuracy, even in a profile specifying an association relationship of one-dimensional tone values with one-dimensional color values. Of course, the color component of the tone values and color values specified by the scan profile can be common to all ink colors, or be different for each ink color.

For example, for all ink colors, it is conceivable that lightness will change if ink usage level is changed, so by specifying an association relationship between $L^*$ and tone values for any RGB in the scan profile, it is possible to achieve accurate calibration. Of course, other combinations could be used as well. For example, Y ink exhibits large change in the $b^*$ component with respect to change in ink usage level, so for Y ink, it would be preferable to make reference to a scan profile specifying an association relationship between $b^*$ and any RGB during calibration.

Further, in this instance, the arrangement may be such as to utilize a scan profile specifying an association relationship of B component tone value and $b^*$, in consideration of complementary color relationships. Of course, when calibrating for other inks, for example, M ink, it will be preferable to make reference to a scan profile specifying an association relationship between $a^*$ and the G component tone value.

The image scanning method and color correction method described hereinabove encompass various aspects, such as being reduced to practice together with other methods, incorporated into a given device. The invention may also be realized in the form of a device corresponding to the arrangement of the aforementioned image scanning method or color correction method. Additionally, the invention may be realized as a program for realizing a certain of the aforementioned method in the case of executing a control program on the aforementioned device, or as a computer-readable recording medium having the program recorded thereon.

Additionally, according to the present invention, as it is possible to carry out calibration of a printing device rapidly and with high accuracy, similar advantages and working effects will be afforded by a printing control device, printing control method or printing control program that executes printing using correction data generated by means of the aforementioned calibration.

When implementing color conversion in such printing control, it suffices to obtain as a result data in which color deviation indicated by the aforementioned correction data has been compensated for. Accordingly, it is possible to employ any of a number of arrangements, such as an arrangement in which a standard color conversion profile is created in advance, and results of conversion by the standard color conversion profile are further corrected by the correction data, or an arrangement whereby color conversion profiles are created in advance for each individual device, so that data is converted after correction.

DETAILED DESCRIPTION

Figure 1:
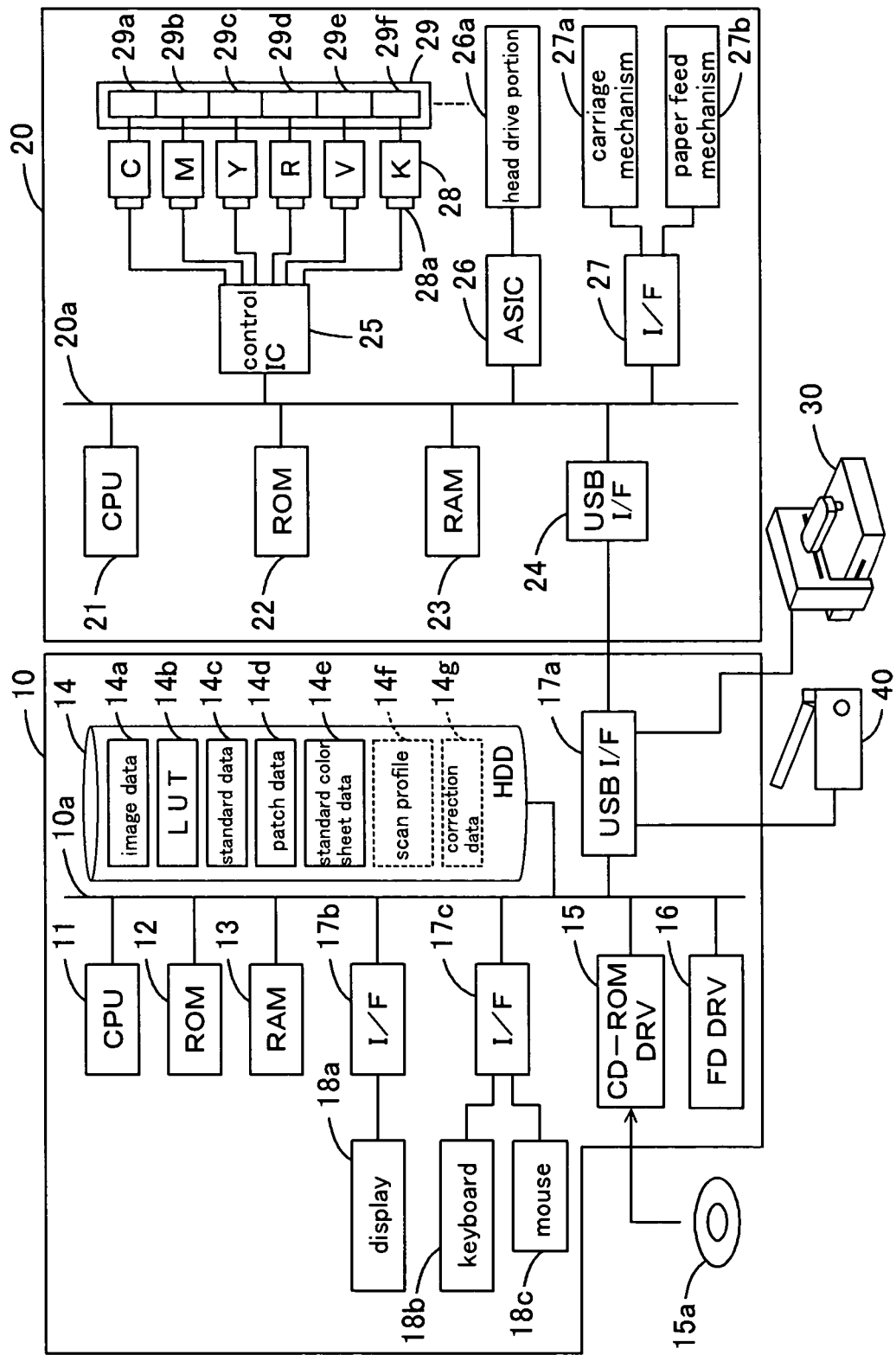
FIG. 1 is a block diagram showing an embodiment of the invention.
Figure 2:
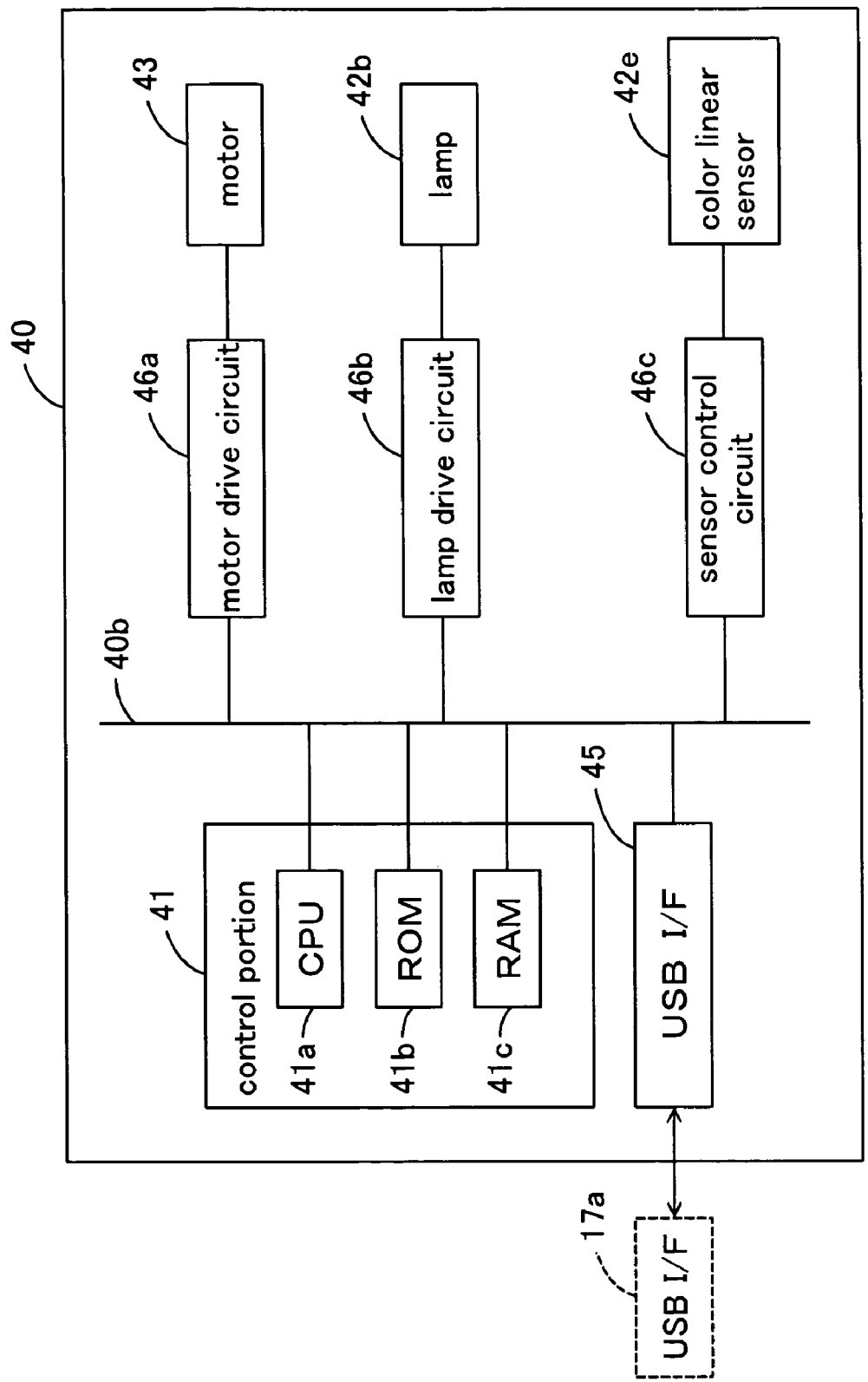
FIG. 2 is a block diagram showing an embodiment of the invention.

The following description of the embodiments of the invention shall be made in the order indicated below.
(1) Arrangement of the Invention:
   (1-1) Hardware Arrangement:
   (1-2) Software Arrangement:
(2) Scan Profile Creation Process:
(3) Calibration Process:
(4) Printing Control Process:
(5) Modification Examples:
   (1) Arrangement of the Invention:

(1-1) Hardware Arrangement:

FIG. 1 and FIG. 2 are block diagrams showing an embodiment of the invention. In the embodiment illustrated in these drawings, the image scanning device pertaining to the invention is composed of a computer 10 and a scanner 40; the computer 10 constitutes the color correction device of the invention, and the computer 10 constitutes the printing control device of the invention. In FIG. 1, the computer 10 and printer 20 are shown in terms of their hardware; in FIG. 3 the scanner is shown in terms of its hardware.

In the computer 10, a CPU 11, ROM 12, RAM 13, an HDD 14, a CD-ROM drive 15, a flexible disk (FD) drive 16, and various kinds of interfaces (I/F) 17a-17c are connected to a system bus 10a, with the CPU 11 providing overall control of the computer. On the HDD 14 are stored an operating system (OS), applications (APL), and the like; these programs are appropriately transferred into RAM 13 and executed. In addition to data for these programs, image data 14a, a LUT (color conversion table) 14b, standard data 14c, patch data 14d, and standard color data 14e are also stored in advance on the HDD 14. Also, in a process described later, a scan profile 14f and correction data 14g are created, and are stored on the HDD 14.

To the USB I/F 17a are connected the printer 20, a colorimeter 30, and the scanner 40. A display 18a is connected to the I/F 17b; and a keyboard 18b and a mouse 18c are connected as control input devices to the I/F 17c. The printer 20 is able to use inks of the colors CMYRVK (cyan, magenta, yellow, red, violet, black). That is, when six ink cartridges 28 are filled with ink of each of these colors and installed, ink of each color is supplied to the head, so that ink drops of each color can be ejected from nozzles to form an image on the printing medium.

Of course, it would also be acceptable to use light cyan, light magenta, light black, dark yellow, unpigmented ink (ink for adjusting gloss), or the like; or to employ a printer in which any [one or more] inks among CMYRVK are not used. It is also possible to use printing devices of various types, such as a bubble type printer that generates bubbles in ink passages in order to eject ink, or a laser printer that uses tone ink to print a printed image onto a printing medium.

In the printer 20, the CPU 21, ROM 22, RAM 23, USB I/F 24, control IC 25, ASIC 26, I/F 27 and so on are connected via a but 20a, with the CPU 21 controlling the various components in accordance with a program written to ROM 22. In the printer 20 pertaining to this embodiment, it is possible to reciprocate a print head unit 29 in the main scanning direction by means of a carriage mechanism 27a. The head has formed thereon a nozzle array for ejecting ink drops, and the ink cartridges 28 can be installed thereon so that the nozzles can be supplied with ink from the ink cartridges 28 in order to eject ink drops. Each ink cartridge 28 has a memory chip 28a on which is recorded remaining ink level etc., with the memory chips 28a being controlled by the control IC 25.

The USB I/F 24 is connected to the USB I/F 17a of the computer 10, and the printer acquires print data from the computer 10 via the USB I/F 24. The ASIC 26 controls a head drive portion 26a so as to form the image represented by the print data. Specifically, in the print data, ink ejection on/off is indicated for each pixel, and applied voltage data for causing ink drops to be ejected in accordance with the print data is output to the head drive portion 26a. From the applied voltage data, the head drive portion 26a generates voltage for application to piezo elements which are embedded in the print heads 29a-29f, and supplies this to the heads. As a result, ink drops are ejected from the print heads 29a-29f. The carriage mechanism 27a and a paper feed mechanism 27b connected to the I/F 27 perform main scanning of the print head unit 29 in conjunction with ejection of the ink drops, and sub-scanning is performed by sequentially advancing the printing paper.

In the arrangement described above, due to factors such as manufacturing error of the nozzle arrays in the print heads 29a-29f or to assembly error in the carriage mechanism 27a or the paper feed mechanism 27, output color for a given set of image data may differ for each device. Thus, in the present invention, in order to match output of an individual device with the output of the standard device, correction data, described later, is created. Accordingly, by carrying out printing with reference to this correction data, error of various kinds can be assimilated, and it becomes possible to achieve output color substantially the same as that of the standard device.

Figure 3:
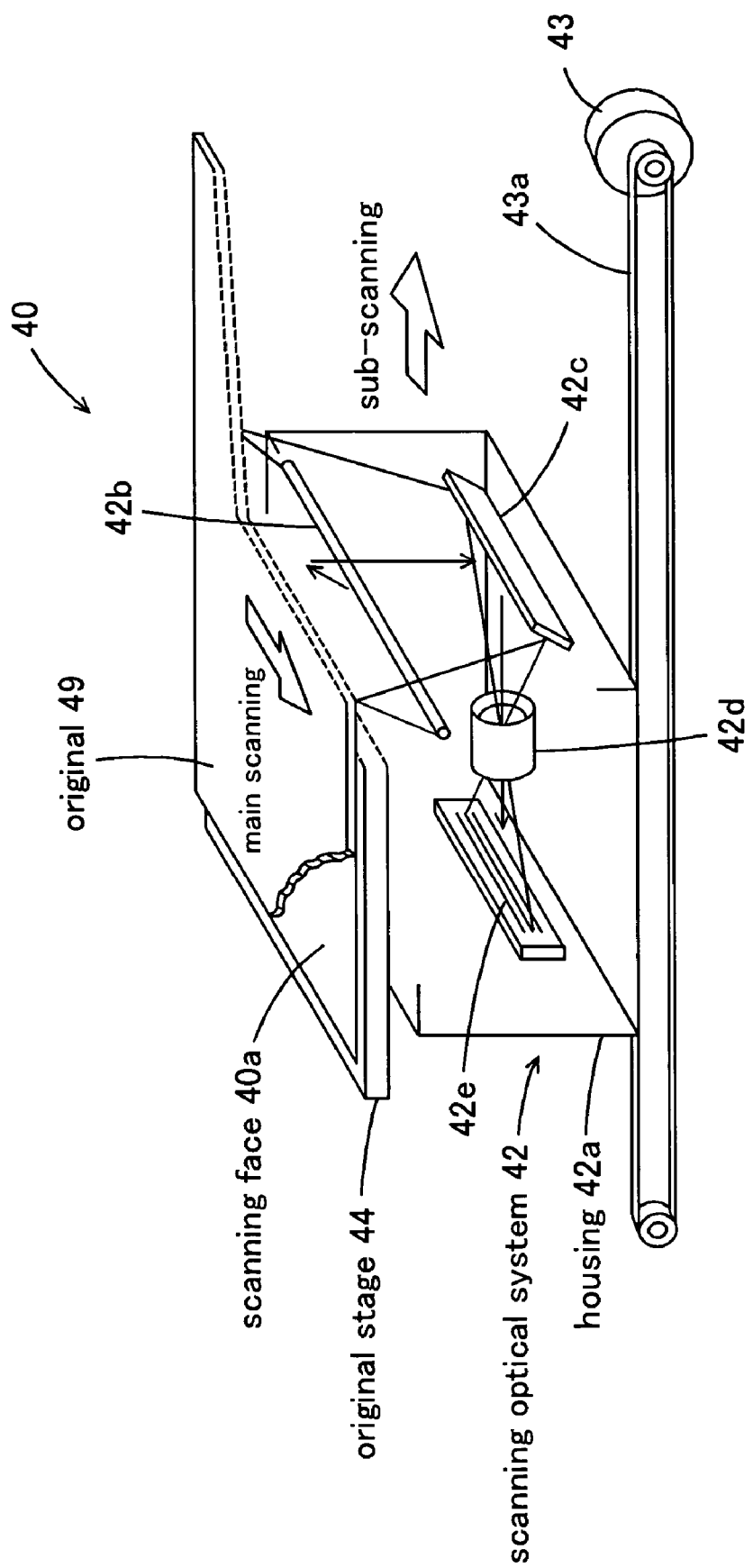
FIG. 3 is a fragmentary exploded perspective view of a scanner.

FIG. 3 is a fragmentary exploded perspective view of the scanner 40 of FIG. 2. The scanner 40 comprises a flat, clear glass original stage 44 shown in FIG. 3, on the top face of a casing, not shown. The upper face of the original stage 44 comprises a scanning face 40a formed with rectangular planar shape, onto which can be placed a printing medium or other original 49. The scanning face 40a is provided also with positioning markings for the purpose of positioning the original 49; by arranging the original so that it is aligned with the markings, a predetermined scan location can be aligned with a predetermined location on the printing medium.

A scanning optical system 42 disposed below the original stage 44 comprises a lamp 42b, a mirror 42c, a lens 42d, and a color linear sensor 42e, housed within a housing 42a. The lamp 42b serves as the light source for illuminating the scanning face 40a, and is disposed parallel to the scanning face 40a towards the main scanning direction of the original. Surrounding the lamp 42b is a cover, not shown, whereby the direction of progress of light is limited by the cover so that the original 49 is illuminated with light in linear fashion. The mirror 42c (flat mirror) disposed diagonally below the light illuminated region in the original (diagonally below to the right in FIG. 3) guides reflected light from the original 49 and reflects the light so as to guide it into the lens 42d.

The reflected light from the mirror 42c is introduced into the lens 42d which guide the reflected light to the color linear sensor 42e comprising a multitude of CCD sensors arranged in linear configuration towards the main scanning direction. The color linear sensor 42e, by means of detecting reflected light via RGB color filters, detects the intensity of reflected light equivalent to one line of the original, for each of the color components RGB. The number of pixels making up this one line can be established by means of scanning conditions, described later, with scan data being generated by identifying the intensity for each of the aforementioned color components RGB, for each of the established pixels.

To the lower face of the scanner optical system 42 is fixed the upper end of a belt 43a disposed generally parallel to the scanning face 40a towards the main scanning direction. This belt 43a is designed to move in the sub-scanning direction by means of rotation of a motor 43, so that the optical system 42 moves in the sub-scanning direction at a predetermined rate of speed along rails (not shown) disposed facing in the sub-scanning direction. The scanner optical system could also be moved using a screw thread, pinion gear, or the like.

The scanner 40 further comprises a control portion 41 comprising the CPU 41a, ROM 41b, RAM 41c and so on as shown in FIG. 2; via the system bus 40b, the control portion 41 controls the various circuits 46a-46c and data transfer by the USB I/F 45. Here, the motor drive circuit 46c to which the motor 43 is connected controls the driving of the motor 43, and the lamp lighting circuit 46b to which the lamp 42b is connected controls the driving of the lamp 42b. The sensor control circuit 46c to which the sensor 42e is connected acquires data output by the sensor 42e, and generates scan data specifying tone values for the colors RGB for each pixel. In accordance with the established scanning conditions, the control portion 41 drives the lamp 42b, motor 43, and sensor 42e, acquires the aforementioned scan data, and sends it to the computer 10 via the USB I/F 45.

Here, due to variation in the quantity of light from the lamp (which is in turn due to the quantity of light of the linear lamp varying depending on location in the main scanning direction), to error in machining or mounting position of the mirror, lens, or color linear sensor, to tilting of the rails relative to the original stage 44, or to variability in sensitivity among the several thousand elements of the color linear sensor, scanning error may occur in each scanning face 40a in a scanner. That is, scan data derived as a result of scanning of a sample of given color at different locations can differ. Thus, in the present invention, a scan profile is created for each scan location, and scanning error of each location is eliminated thereby.

By eliminating scanning error of each location in this way, it is possible while preserving the advantage of a flatbed scanner of being able to scan a large number of images all at once, to also achieve scanning with high accuracy. Accordingly, the scanner can be used during mass production of printers 20 for the calibration procedure to match output color of mass produced devices with that of a standard device, and the system depicted in FIGS. 1 and 2 is a system that would be serviceable for the calibration procedure in mass production.

Figure 4:
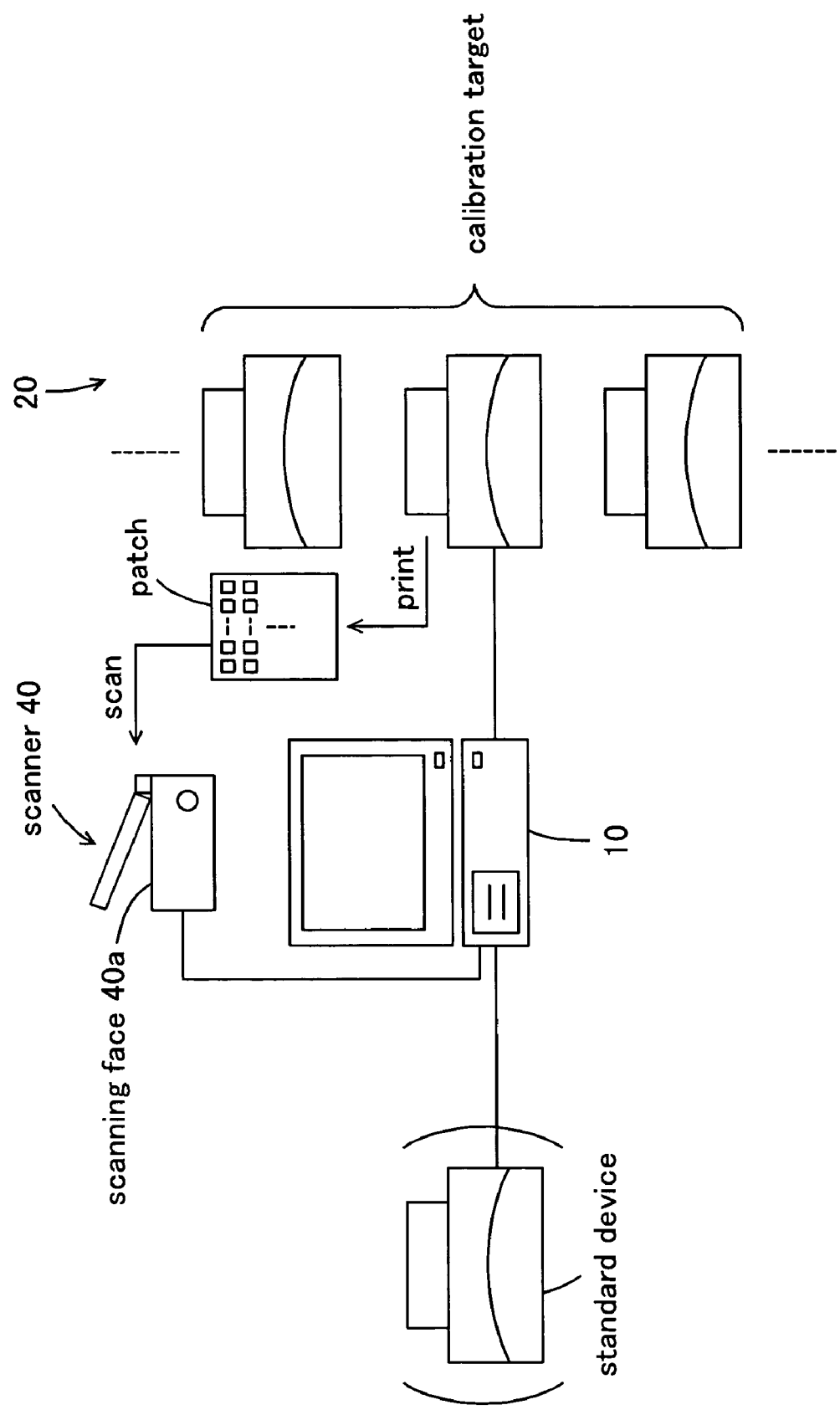
FIG. 4 is a diagram illustrating a mass production system.

FIG. 4 is a diagram illustrating a mass production system. The calibration depicted in the drawing is a procedure used when printing has been carried out on the basis of given image data, for adjustment so that the standard device and an individual device targeted for calibration produce identical output color. During the calibration procedure, a LUT is created so that color matching is done in advance in the standard device.

The printer 20 connected to the computer 10 is of the same model as the standard device, but has not been subjected to color matching on a per-device basis. That is, in the printer 20 targeted for calibration, various elements will differ from the standard device due to head fabrication error, assembly error, and the like, so that for the same image data as the standard device, identical color is not guaranteed even where printing is carried out by means of the LUT.

Thus, patches are printed out with the printer 20 targeted for calibration, and the printed patches are scanned with the scanner 40. Once the patches have been scanned with the scanner 40, it is now possible to acquire the discrepancy between output color in the standard device and output color in the calibration target, as will be described later, whereby it becomes possible to create correction data for the purpose of compensating for this discrepancy. By means of an arrangement whereby this correction data can be used by the printer 20, it becomes possible to carry out calibration. That is, in the event that printing is carried out by the printer 20 after calibration, color matching similar to the standard device is accomplished.

Since the example shown in FIG. 4 pertains to calibration during mass production, when calibration has been completed for a single printer 20, the procedure is carried out sequentially targeting the next printer 20 for calibration. Here, with the scanner 40 it is possible to scan a large number of patches all at once with high accuracy, as noted previously. Even with a scanner equipped with an A4 size original stage, which are currently available at very low cost, it is possible in a single scan to scan a number of patches sufficient to carry out calibration for one printer 20. Accordingly, as compared to the case of color measurement with a colorimeter, patches can be scanned very rapidly, and the efficiency of mass production procedures can be improved dramatically.

Figure 5:
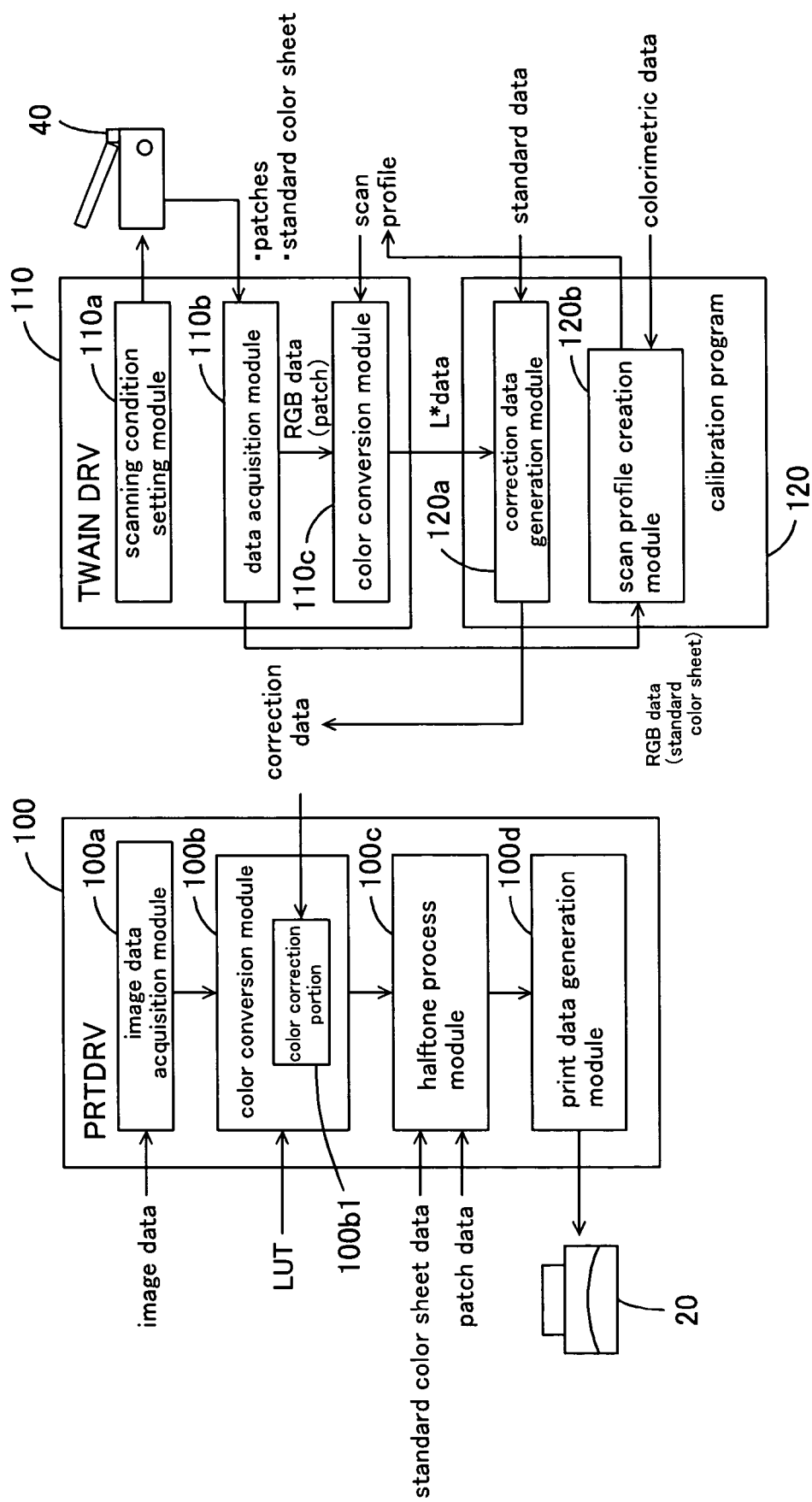
FIG. 5 is a functional block diagram of the invention.

(1-2) Software Arrangement:

The description now turns to the software arrangement for realizing the present invention by means of the hardware described previously. FIG. 5 is a functional block diagram of printer driver (PRTDRV) 100, scanner driver (TWAINDRV) 110, and calibration program 120 functions executed by the computer 10. Of course, in the computer 10 these programs could be executed under the control of the aforementioned OS, with driver (not shown) for controlling communication via the USB I/F 17a executed as well.

The TWAINDRV 110 comprises a scanning condition setting module 110a, a data acquisition module 110b, and a color conversion module 110c. The scanning condition setting module 110a displays a predetermined settings screen (not shown) on the display 18a. Settings input by the user by operating the keyboard 18b or mouse 18c while verifying them on the screen are received, and data indicating the scanning conditions is output to the scanner 40. In the control portion of the scanner 40, printing conditions are set on the basis of the data indicating printing conditions.

The data acquisition module 110b is a module that drives the scanner 40 to acquire scan data. Specifically, it outputs from the aforementioned USB I/F 17a control data for the purpose of carrying out the scanning operation to the scanner 40, and acquires from the USB I/F 17a the scan data output by the scanner 40 on the basis of the control data. In this embodiment, scan data for the patches targeted for scanning when executing the aforementioned calibration and scan data for the standard color sheets targeted for scanning when creating the scan profile 14f are acquired.

The color conversion module 110c is a module that extracts the R data from the scan data (RGB data for each pixel), and converts it to L*. The patches described above are patches printed in the printer 20 targeted for calibration, for which the monochromes only are non-zero tone values for each of the colors CMYRVK. Accordingly, in the color conversion module 110c, once L* has been acquired for each patch, an association relationship between tone values of each color and their L* values in the printer 20 targeted for calibration can be derived. In this embodiment, a determination is made as to the location on the scanning face 40a for each R data from the scan data, and with reference to the scan profile 14f associated with that location the R data is converted to L*. Accordingly, L* of the scan target can be acquired accurately without being affected by scan error of each location.

The calibration program 120 comprises a correction data generation module 120a and a scan profile creation module 120b. The correction data generation module 120a is a module that acquires L* output by the aforementioned color conversion module 110c and generates correction data 14g for the purpose of correcting discrepancy from the standard device. In this embodiment, the standard data 14c is data associating color values (L*) with a plurality of tone values for each of the colors CMYRVK; color values are the result of color measurements made when printing is carried out in the aforementioned standard device on the basis of the tone values.

Accordingly, by comparing L* output by the color conversion module 110c with L* described in the standard data 14c, it is possible to acquire discrepancy in output color between the standard device and the printer 20 targeted for calibration. Once this discrepancy has been acquired, it is a simple matter to create the correction data 14g, described later.

The scan profile creation module 120b is a module that creates the scan profile 14f; it generates scan profiles by associating calorimetric values of standard color sheets with scan data. Specifically, as will be described later, the scan profile creation module 120b acquires colorimetric values of standard color sheets and scan data (RGB data), and associates data for the same location with one another. In this embodiment, location recorded in the scan profile 14f is the same location as the location at which an aforementioned patch is printed. The scan profile 14f is crated in advance prior to the aforementioned calibration. Accordingly, calibration can be carried out unaffected by scan error at each location.

The PRTDRV 100 comprises an image data acquisition module 100a, a color conversion module 100b, a halftone process module 100c, and a print data generation module 100d. Using an aforementioned APL or the like, when the user issues a command to execute printing of an image, the modules of the PRTDRV 100 execute the printing process. The image data acquisition module 100a acquires image data representing the image targeted for printing, and where needed performs a resolution conversion process to compensate for an excessive or deficient pixel count.

Specifically, the image data 14a representing the image targeted for printing is acquired, and the number of pixels needed for printing is calculated according to preset printing conditions (resolution and actual size at the time of printing) and the like. The calculated pixel count and the pixel count of the acquired image data 14a are compared, and if the pixel count of the acquired image data 14a is smaller an enlargement process is carried out by means of interpolation calculations, whereas if the pixel count of the acquired image data 14a is greater a reduction process is carried out by means of interpolation calculations. In this embodiment, this image data 14a is data of dot matrix form specifying color of each pixel through tone representation of RGB color components. In this embodiment, each color has 256 tones, and the image data employs a color system in accordance with the sRGB specification.

Of course, image data 14a is not limited to an RGB color system; JPEG image data employing the YCbCr color system, image data employing the CMYK color system, or various other types of data could be used instead. Of course, the invention is also applicable to data conforming to the Exif 2.2 Standard (Exif is a registered trademark of the Japan Electronic Industry Development Association), or to data corresponding to Print Image Matching (PIM: PIM is a registered trademark of Seiko Epson Corp.).

The color conversion module 100b is a module that converts the color system that represents the color of each pixel; making appropriate reference to the LUT (color conversion table) 14b recorded on the HDD 14, it converts the sRGB color system of the image data into a CMYRVK color system having as components the inks installed in the printer 20. The LUT 14b is a table that represents the respective colors of the sRGB color system and the CMYRVK color system as well as associating the two with one another, and that describes this association relationship for a plurality of colors. Accordingly, for an arbitrary color represented in the sRGB color system, by referring to sRGB colors which are nearby colors and which are specified in the LUT 14b, it is possible to calculate, by means of interpolation, a color corresponding to this arbitrary color in the CMYRVK color system, so that color conversion may be carried out.

Data of the CMYRVK color system is image data represented in 256 tones for each of the colors CMYRVK, with tone values corresponding to individual pixels and ink levels of each color. For example, with the maximum ink level recordable per unit of planar area for each color associated with a tone value of 255, ink recording levels could be associated in linear fashion with tone values of 0-255, or the ink levels signified by tone values otherwise determined in advance, whereby in the halftone process module 100c tone number conversion is carried out to give ink levels corresponding to tone values.

Even if ink levels signified by CMYRVK tone values are determined as described above, due to individual device manufacturing errors etc. in the printer 20, it is not always the case that ink levels corresponding to tone values can be output correctly. Thus, the printer 20 pertaining to this embodiment comprises a mechanism to compensate for this kind of error. Specifically, correction data 14g that corrects tone values for each color is recorded on the HDD 14, and the color correction portion 100b1 of the color conversion module 100b refers to the correction data 14g to correct CMYRVK tone values after conversion by the aforementioned LUT 14b.

In this embodiment, prior to the time that the printer 20 is shipped, the aforementioned correction data 14g is created by the manufacturer of the printer 20, and the correction data 14g is recorded onto the HDD 14 during installation of the PRTDRV 100. Accordingly, in the printer 20 it is possible to always carry out output substantially identical to output color of the standard device. The correction data 14g may be recorded in EEPROM (not shown) in the printer 20, recorded on a medium that records the program for installation, or any of various other arrangements employed. In the present invention, if the scanner 40 and the printer 20 are connected to the computer 10, and the calibration program 120 is run, the correction data 14g can be created. Accordingly, it is possible for the user of the printer 20 to himself carry out calibration for the purpose of creating this correction data 14a.

Once color conversion has been carried out by the color conversion module 100b to obtain CMYRVK data, the halftone process module 100c converts tone values of pixels represented in the CMYRVK color system to halftone image data specifying ink ejection on/off in each pixel. That is, ink drop ejection on/off for each pixel is determined in the printer 20. Of course, it would also be acceptable for ejected ink level to be controllable in stepwise fashion rather than just ink drop ejection on/off, and to determine the size of ejected ink drops.

In this embodiment, the aforementioned patch data 14d and standard color sheet data 14e can be data specifying patch color or standard color by means of CMYRVK tone values with the halftone process module 100c acquiring this data and performing processing. That is, in this embodiment, when printing on the basis of patch data 14d and standard color sheet data 14e, patches or standard color sheets can be printed without going through conversion by the color conversion module 100b.

The print data generation module 21d receives the image data after the aforementioned halftone process, sorts it in the order in which it will be used by the printer 20, and outputs the data serially to the printer 20 in units equivalent to that used for a single main scan. Specifically, since in the aforementioned nozzle array a plurality of ejection nozzles are arranged in parallel in the sub-scanning direction, data spaced several dots apart in the sub-scanning direction is used at the same time.

Accordingly, of data lined up in the sub-scanning direction, that should be used at the same time is sorted in order so as to be buffered at the same time in the printer 20. The print data generation module 21d then appends predetermined information, e.g. image resolution etc., to the sorted data to generate print data, which is sent to the printer 20 via the USB I/F 17a. In Accordingly, data that, of data lined up in the sub-scanning direction, is to be used at the same time is sorted in order so as to be buffered at the same time in the printer 40. The print data generation module 21e then appends predetermined information, e.g. image resolution etc., to the sorted data to generate print data, which is sent to the printer via the USB I/O 19b. Once all the data needed to form the image has been transferred to the printer, an image is formed on a printing medium by the printer 20 on the basis of this data.

Figure 6:
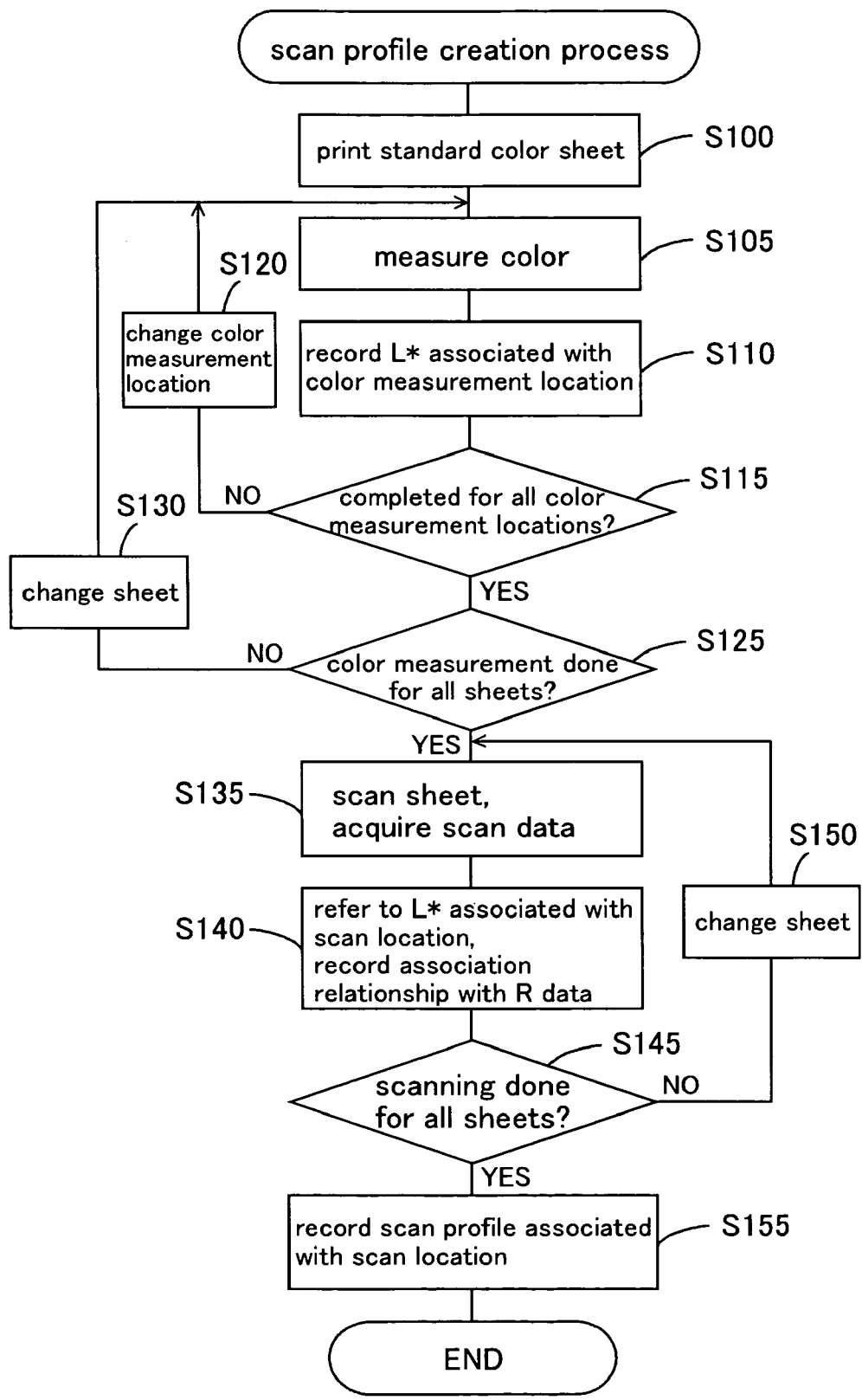
FIG. 6 is a flowchart of the process for creating a scan profile.

(2) Scan Profile Creation Process:

Following is a detailed description of the process for creating the scan profile 14f in the arrangement described above. FIG. 6 is a flowchart of the process in the scan profile creation module 120b of the calibration program 120. This process is executed in advance prior to executing the aforementioned calibration, using the scanner 40 that will be used at the time of calibration.

When the process by the scan profile creation module 120b is initiated, in Step S100 the standard color sheet data 14e is handed over to the halftone process module 100c. The standard color sheet data 14e is a plurality of data points specified such that ink of each of the colors CMYRVK is printed in monochrome over the entire face of the printing medium, which data is for the purpose of outputting a plurality of sheets onto which [inks] of each color have been recorded at different ink recording rates (for example, recording rates that vary from 5% to 100% in increments of 5%).

Here, the ink level limit for the printing medium serving as the standard color sheet is designated as the 100% ink recording rate. Accordingly, standard color sheet data 14e is data having non-zero tone value for a single color only, with tone values for other colors being "0". When this standard color sheet data 14e is handed over to the halftone process module 100c, a standard color sheet is printed by means of processing in the halftone process module 100c and the print data generation module 100d.

Specifically, any of the CMYRVK inks is printed onto a single printing medium, producing on each sheet a plurality of sheets with different ink recording rates. In this embodiment, standard color sheets are printed by the printer 20 targeted for calibration, but since the scan profile creation procedure is carried out prior to calibration, printing could be carried out on the standard device printer 20 instead.

Once standard color sheets have been derived, the user uses the aforementioned colorimeter 30 to measure color of the standard color sheets at a plurality of locations while ascertaining the location of measurement. Colorimetric data indicating colorimetry results are input to the computer 10 via the USB I/F 17a, so in Step S105 the colorimetric data is acquired by the scan profile creation module 120. Once the calorimetric data is acquired, in Step S110 the color measurement location and calorimetric value thereof ($L^*$ in this example) are associated with one another while being recorded temporarily in RAM 13. This color measurement location coincides with the patch printing location during calibration, described later.

In Step S115, a determination is made as to whether the colorimetric data acquisition process has been completed for all predetermined locations. If in Step S155 it is not determined that [the process] has been completed for all locations, in Step S120 the color measurement location is changed and the process beginning with Step S105 is repeated. If in Step S155 it is determined that the colorimetric data acquisition process has been completed for all locations, in Step S125 the determination is made that colorimetric data has been acquired for all sheets. Specifically, it is determined that standard color sheets at all ink recording rates for all of the colors CMYRVK have been subjected to color measurement, and that the colorimetric data thereof has been acquired.

If in Step S125 it is not determined that colorimetric data has been acquired for all sheets, in Step S130 the sheet targeted for color measurement is changed and the process beginning with Step S105 is repeated. In instances where the standard color sheets are printed in the aforementioned standard device and can be printed with high accuracy, it is possible to omit the colorimetry procedure described later, since output color at each ink recording rate is known. By means of the above process, for all of the standard color sheets, colorimetric values corresponding to all predetermined locations are acquired. Once the calorimetric values have been acquired, these standard color sheets are then scanned with the scanner 40.

Specifically, in Step S135 the TWAINDRV 110 is run, and scanning conditions are set by the scanning condition setting module 110a. The user places the standard color sheet targeted for scanning onto the original stage 44 of the scanner 40 and initiates scanning. As a result, the scanner 40 scans the standard color sheet, and the scan data acquisition module 10b acquires the scan data. The aforementioned scanning conditions are set to conditions identical to conditions during use of the scan profile 14f. Specifically, scan profiles 14f in this embodiment are associated with specific resolution and other conditions for carrying out scanning; when scanning patches, described later, reference is made to the scan profile 14f associated with scanning conditions when carrying out color conversion in the color conversion module 110c.

In Step S135, once scan data (RGB data) of a sheet has been acquired, the scan location on the standard color sheet is ascertained from the scan data, and the colorimetric value of the color measurement location (color measurement location in S105) corresponding to the scan location in question is acquired. In Step S140, the calorimetric value (L*) and the scan data (R data in this embodiment) for a given location are associated with one another, and the association relationship is recorded temporarily in RAM.

In the scanner 40, since is it possible to scan the entire range of a standard color sheet all at one time, in the course of a single scan association relationships for colorimetric values and scan data can be specified for all color measurement locations in a single standard color sheet. Of course, during acquisition of scan data, it is sufficient to be able to acquire the scan data of the aforementioned color measurement locations, so portions of the image outside the color measurement locations need not be scanned.

In Step S145, a determination is made as to whether performance of the scanning process and association of calorimetric values with the scan data have been completed for all of the standard color sheets printed in Step S100. If in Step S145 it is not determined that scanning has been completed for all sheets, in Step S150 the standard color sheet targeted for scanning is changed, and the process beginning with Step S135 is repeated. By means of the above process, association relationships of calorimetric values and scan data at all predetermined locations is derived for all standard color sheets.

Figure 7:
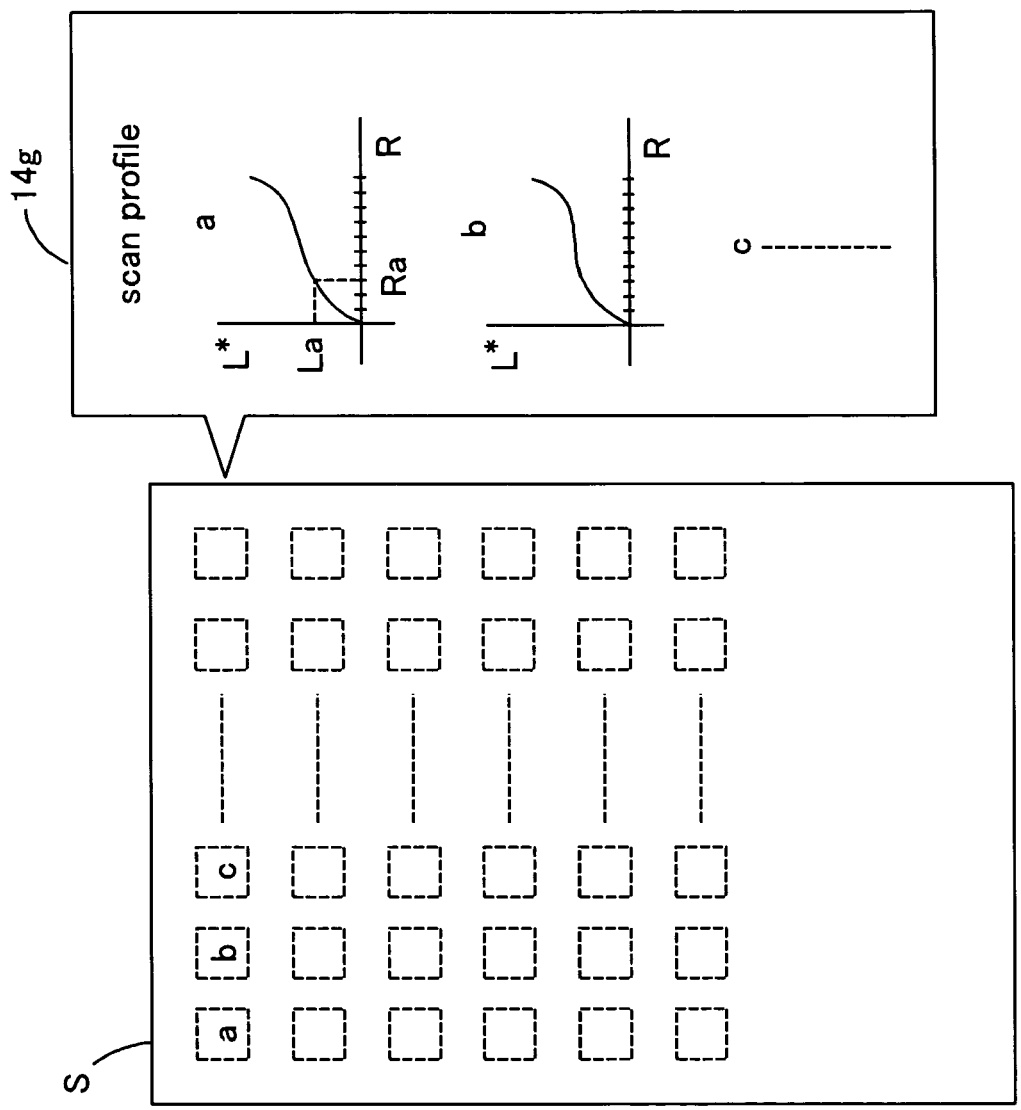
FIG. 7 is a diagram illustrating a scan profile.

At this point, in Step S155, the data associating the scan data and calorimetric values is in turn associated with scanning location thereof, to create a scan profile 14f. The scan profile 14f is recorded on the HDD 14. FIG. 7 is a diagram illustrating the scan profile 14f In the drawing, the letter S denotes a standard color sheet in model form; the rectangles indicated by the broken lines on the standard color sheet S denote scan locations. The letters a, b, c shown in the rectangles are symbols that denote each scan location.

In the aforementioned standard color sheet, since ink recording rate varies for each monochrome color, the luminance of color recorded onto each sheet will differ. Accordingly, in the process up through Step S145 described previously, calorimetric values (L*) corresponding to a plurality of scan data (R data) points are derived for each scan location a, b, c, .... For example, an association relationship like that of luminance La corresponding to scan data Ra at scan location a in FIG. 7 is obtained for a plurality of scan data points.

With this association relationship it is possible to calculate, by means of interpolation or the like, a colorimetric value corresponding to any scan data point. That is, it is possible to ascertain from a plurality of association relationships an association relationship of any scan data point and colorimetric value as indicated by the solid line of graph shown in FIG. 7. Accordingly, this association relationship is the profile in the scanner 40. By deriving this profile for each scan location a, b, c, ... it is possible to derive accurate colorimetric values for each location.

Figure 8:
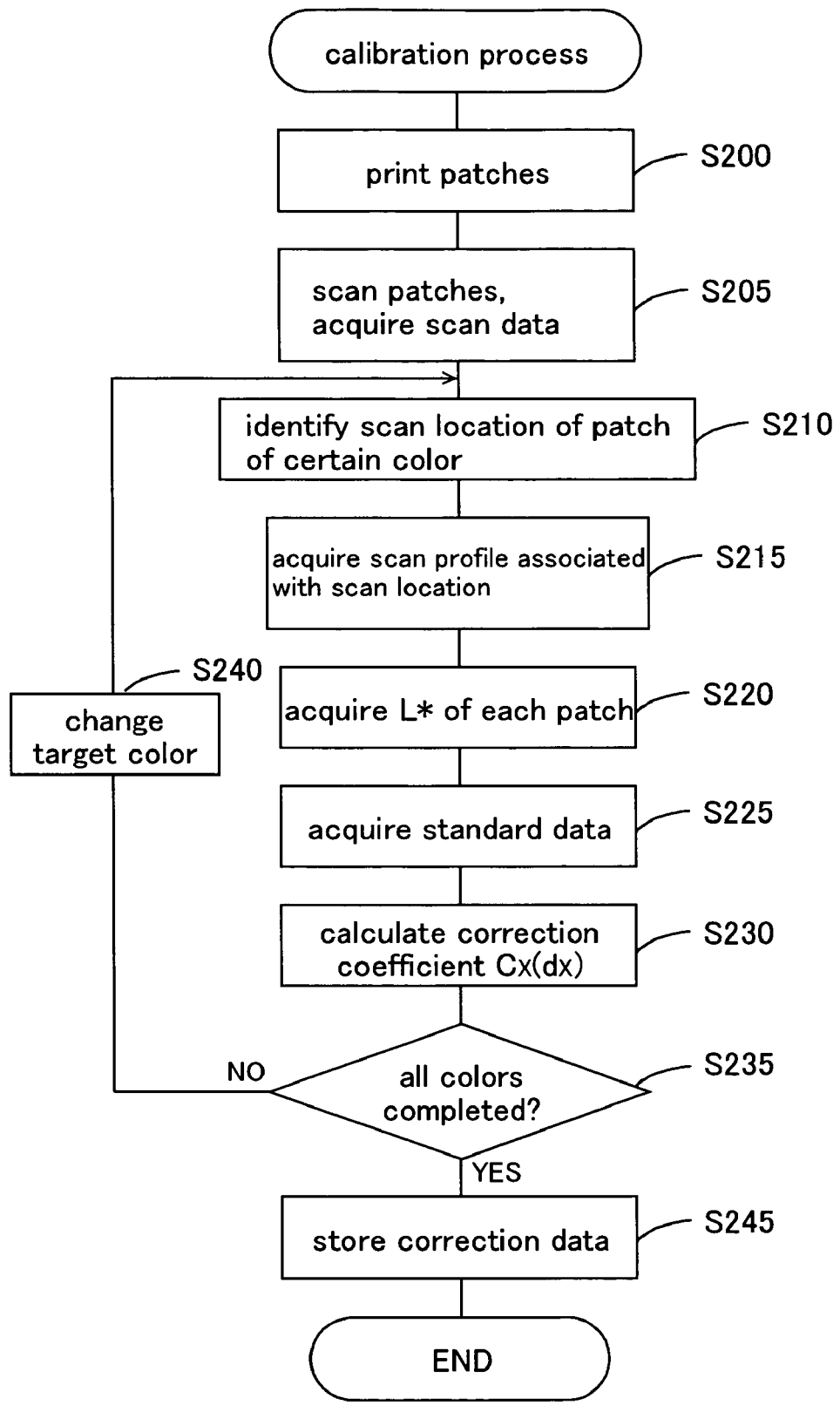
FIG. 8 is a flowchart of the calibration process.

(3) Calibration Process:

FIG. 8 is a flowchart of the process in the correction data generation module 120a of the calibration program 120. Once the process by the correction data generation module 120a is initiated, in Step S200 the patch data 14d is handed over to the halftone process module 100c. The patch data 14d is data for the purpose of printing patches at locations corresponding to the aforementioned scan locations a, b, c, ... on the printing medium, and data for the purpose of outputting patches at different ink recording rates (e.g. recording rates that vary from 10% to 100% in increments of 10%) with CMYRVK monochrome colors at each location.

Figure 9:
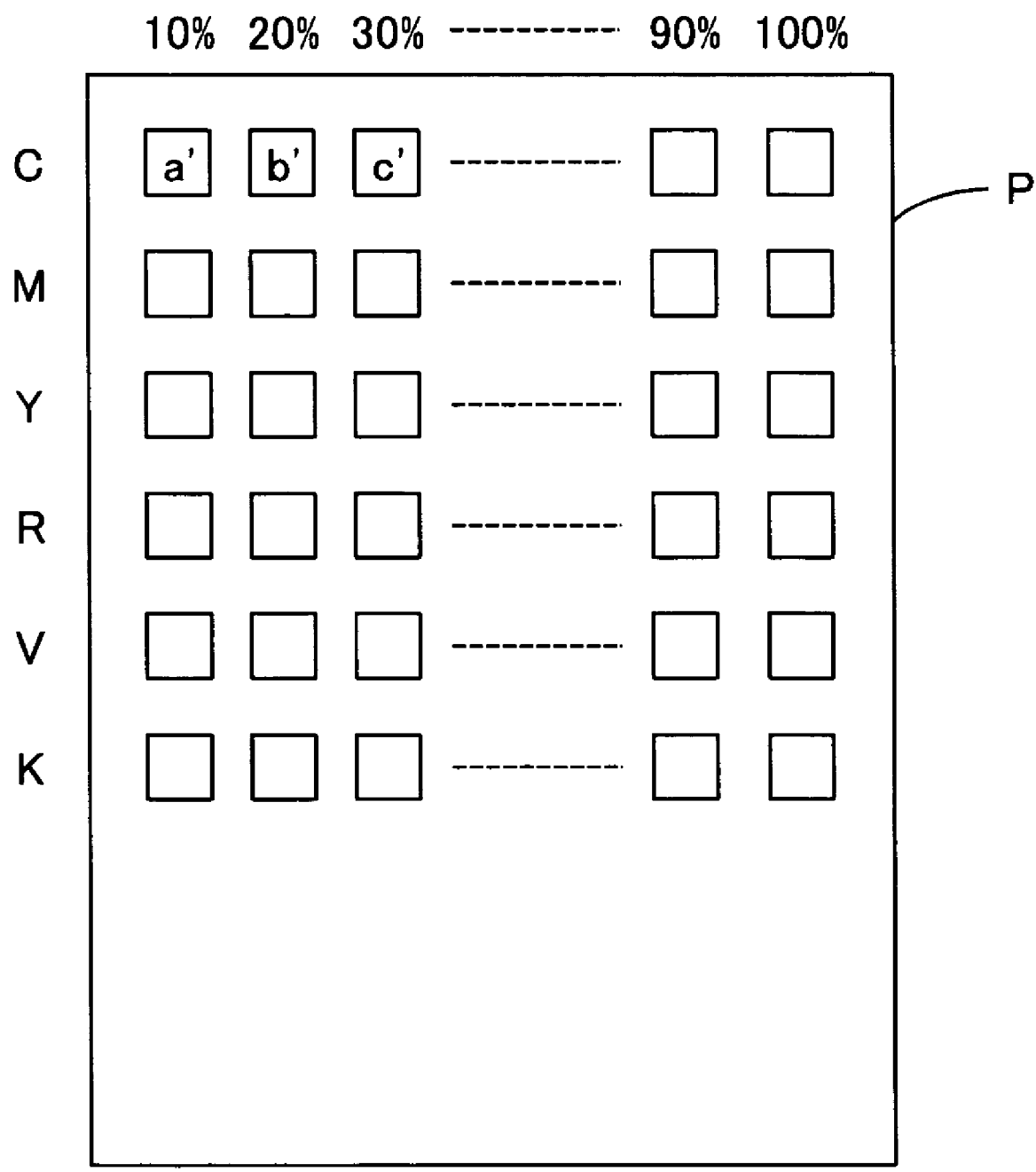
FIG. 9 is a diagram of patches.

For example, as shown in FIG. 9, the data is determined such that, with locations a', b', c' ... on the printing medium P as the recording locations of the rectangular patches, the ink recording rate increases from left to right, and only ink of the same given color is used in the lateral direction. That is, CMYRVK patches are arrayed that that order starting from the top. In this way, the patch data 14d is data for printing patches of all ink colors onto a single printing medium. Since only one color of ink is used in each patch, here as well, the patch data 14d is data having non-zero tone value for a single color only, with tone values for other colors being "0".

When the aforementioned patch data 14d is handed over to the aforementioned halftone process module 100c, processing is carried out in the halftone process module 100c and the print data generation module 100d, and patches like those shown in FIG. 9 are printed by the printer 20 targeted for calibration. In this embodiment, this Step S200 corresponds to the step of printing patches recited in the claims. Once the patches are printed, in Step S205, the TWAINDRV 110 is run, and scanning conditions are set by the scanning condition setting module 110a. The user places the printing medium P with the patches printed thereon onto the original stage 44 of the scanner 40 and initiates scanning. As a result, the scanner 40 scans the patches, and the scan data acquisition module 110b acquires the scan data. While the aforementioned scanning conditions are arbitrary, conditions identical to conditions that were set during use of the scan profile 14f are set. In this embodiment, this Step S205 corresponds to the image scanning step recited in the claims.

In Step S205, once the patch scan data (RGB data) has been acquired, in Step S210, data of patches of a certain color is extracted from the data, and the scan location of the data (in the example in FIG. 9, scan locations of a plurality of patches lined up in the lateral direction) is identified. Since the aforementioned scan profiles 14f are associated with scan locations, in Step S215, the scan profile corresponding to the scan location of the aforementioned extracted data is acquired. In this embodiment, the process in Steps S210, S215 corresponds to the step of acquiring a scan profile recited in the claims.

In Step S220, referring to the scan profile 14f corresponding to the location of each patch, the calorimetric value (L* in this embodiment) corresponding to the scan data (R data in this embodiment) of each acquired patch is acquired. In this embodiment, the process in Step S220 corresponds to the color value acquiring step recited in the claims. Colorimetric values acquired in this way are accurate colorimetric values of the patches, but since the printer 20 that has printed the patches targeted for color measurement is the printer being calibrated, patch output color per se may differ from output color of the standard device in some instances.

Thus, in order to compensate for color deviation, in Step S225, the standard data 14c is acquired. By means of the above process, association relationships of tone values and color values are obtained for the printer 20 being calibrated and for the standard device. In Step S230, on the basis of these, there is calculated a correction coefficient $C_x(d_x)$ for the purpose of correcting output color of the printer 20 targeted for calibration, so that it is substantially identical to that of the standard device.

Figure 10:
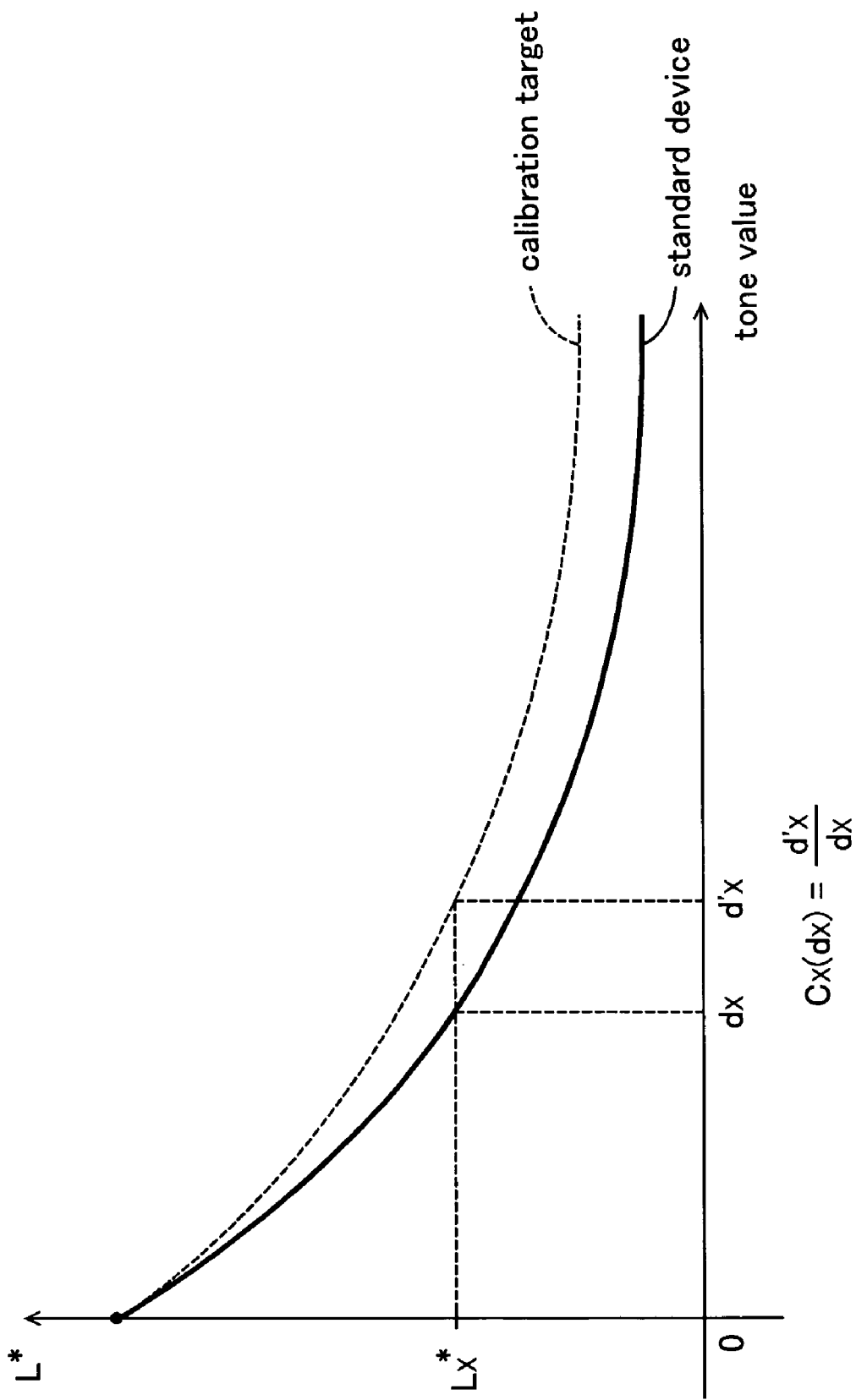
FIG. 10 is a diagram illustrating the method for determining a correction coefficient $C_x$.

FIG. 10 a diagram illustrating the method for determining the correction coefficient $C_x$. In the drawing, the horizontal axis gives tone values of CMYRVK data, and the vertical axis gives L*. As noted, once colorimetric values for a plurality of tone values in the printer 20 being calibrated and color values in the standard device have been acquired, the color value L* for any tone value may be identified by means of interpolation or the like as shown in FIG. 10. In this embodiment, on the basis of differences in luminance as shown in FIG. 10, tone values with common luminance for the standard device and the calibration target are acquired to calculate the correction coefficient.

More specifically, where the output color of the standard device at a tone value of $d_x$ is $L_x$*, there is acquired a tone value $d_x$' such that the output color of the calibration target is $L_x$*. The correction coefficient is defined as the ratio of these tone values, and is given as $C_x(d_x)=d_x'/d_x$. That is, since $L_x$* is the luminance that should be output at tone value $d_x$, when it is intended to execute printing at tone value $d_x$, in the printer being calibrated the correction coefficient will be multiplied by this tone value $d_x$.

Then, by carrying out printing on the basis of the corrected tone value $d_x$' derived by multiplying by the correction coefficient, output of luminance $L_x$* is obtained. That is, by using the correction coefficient, calibration can be carried out. In this embodiment, the correction coefficient for any tone value is calculated in the aforementioned Step S230.

In Step S230, once the correction coefficient $C_x(d_x)$ has been calculated, in Step S235 a determination is made as to whether a correction coefficient has been calculated for all of the colors CMYRVK. If in Step S235 it is [Sic: not?] determined that the process of calculating a correction coefficient has been completed for all colors, the color targeted for calculation of correction coefficient is changed, and the process starting with Step S210 is repeated. If in Step S235 it is determined that the process of calculating a correction coefficient has been completed for all of the colors CMYRVK, in Step S245, data indicating the correction coefficient calculated for each color is stored as correction data 14g on the HDD 14. In this embodiment, Steps S225, S230 and S245 correspond to the step of generating correction data recited in the claims.

Figure 11:
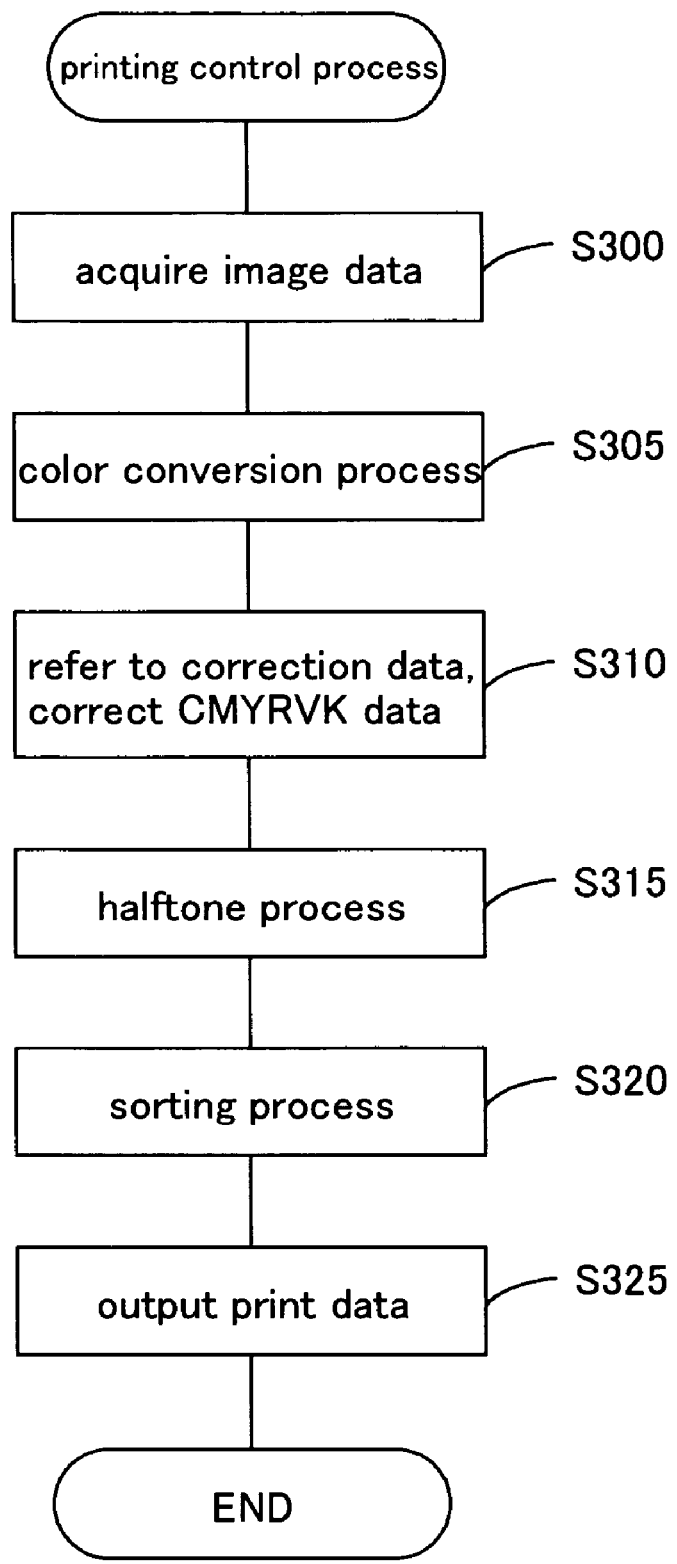
FIG. 11 is a flowchart of the printing control process.

(4) Printing Control Process:

Next, the printing control process used when carrying out printing that reflects the aforementioned calibration is described. FIG. 11 is a flowchart during execution of printing with the PRTDRV 100, using correction data 14g created in the preceding manner. When the user issues an image print command from an application (not shown) etc., the process shown in FIG. 11 is initiated, and in Step S300 the aforementioned image data acquisition module 10a acquires the aforementioned image data 14a. At this time, resolution conversion is performed as needed. In this embodiment, this Step S300 corresponds to the step of acquiring image data recited in the claims. Once the resolution conversion process is carried out, in Step S305 the aforementioned color conversion module 100b acquires the LUT 14b that has been stored on the aforementioned HDD 14, and while making reference to the LUT 14b, converts the aforementioned resolution-converted RGB data to CMYRVK data by means of an interpolation process.

Since this CMYRVK data is data for output of color indicated by the RGB data in the standard device, in Step S310 the color correction portion 100b1 performs color correction on the CMYRVK data. Specifically, the color correction portion 100b1 acquires the aforementioned correction data 14g, and for any tone value of the CMYRVK data calculates the tone value $d_x$× the correlation coefficient $C_x(d_x)$ for each color to correct the data. With the corrected data, the calibrated printer 20 can output color representing RGB data in the same way as the standard device. In this embodiment, the Steps S305, S310 correspond to the step of color conversion recited in the claims.

In Step S315, the halftone process module 100c performs the halftone process on the corrected CMYRVK data. The print data generation module 100d receives the halftone processed data and sorts it in the order in which it will be used by the printer 20. Then, in Step S325, print data is generated from this sorted data, and is sent to the printer 20 via the USB I/F 17a. As a result, an image is printed on the basis of the image data 14a by the printer 20. In this embodiment, Steps S315-S325 correspond to the step of printing recited in the claims. Since the image printed in the above manner has been corrected by means of the correction data 14g, accurate color can be output by the individual printer 20 with different ink ejection characteristics as compared to the standard device.

(5) Modification Examples:

The embodiment hereinabove is an example for the purpose of realizing the invention, and it is of course possible to employ other arrangements. For example, in a scan profile 14f, it suffices to be able to specify an association relationship between scan data tone values and color values thereof, and is not limited exclusively to an arrangement specifying the association relationship of R data and L* as in the embodiment hereinabove. For example, color deviation could be compensated on the basis of the association relationship of R data and a* or b*; or G data or B data could be associated with either L*, a*, or b*, and color deviation compensated for from the association relationship of the two.

The arrangement is not limited to one where color is compensated on the basis of the association relationship of a single component. That is, any one or more color components of RGB data could be associated with any one or more of the color components L*a*b*, and color deviation compensated for from the association relationship between the two. Of course, a larger number of color components means that color deviation can be compensated for with higher accuracy.

When specifying association relationships for any combination of RGB data components and L*a*b* components, the combination may differ for each color. For example, for Y ink, of the L*a*b* components, the b* component exhibits large change with respect to change in tone value. Since the Y component and B component are in a complementary color relationship, it is conceivable that the b* component will tend to change readily with a change in the B component. Accordingly, by specifying an association relationship of B data and b* for Y ink, it is possible to compensate for color deviation with high accuracy, with few color components. Of course, it would be possible to employ various other arrangements specifying association relationships of G data and a* for M ink, for example.

Further, whereas in the embodiment hereinabove, the printer 20, the scanner 40, and the colorimeter 30 are connected to the computer 10, and calibration, printing that reflects calibration, and scanning with high accuracy are carried out, an arrangement whereby these are realized with a separate computer would also be acceptable. That is, in an arrangement wherein the scanner 40 is connected to the computer 10, it would be possible to provide a system capable of scanning with high accuracy unaffected by color deviation due to scan location.

In an arrangement wherein the computer 10 and the printer 20 are connected, by executing printing with reference to scan profiles 14f, it would be possible to provide a system capable of printing with high accuracy, in which color deviation from the standard device does not occur. Of course, an arrangement wherein the computer 10, the printer 20, and the scanner 40 are connected, it would be possible to provide a system for carrying out calibration using scan profiles 14f created in advance.

Particularly when carrying out calibration in a mass production setting, envisioning a mode in which the user acquiring a mass-produced article carries out printing that reflects calibration, the arrangement for carrying out correction by means of correction data 14g and carrying out printing can be any arrangement whereby the correction data 14g is copied to the computer 10 when the computer 10 and the printer 20 are connected and the PRTDRV 100 is installed. Of course, the invention is also applicable to a so-called multifunction device incorporating a scanner 40 and a printer 20. In this case, it is possible to have an arrangement whereby scan profiles 14f are created in advance, and the user performs the calibration himself to create the correction data 14g.

Further, whereas the standard color sheets mentioned hereinabove are arranged so as to print monochrome ink onto the printing medium, it would of course be possible to utilize a greater number of inks for the standard color sheets, and to associate calorimetric values thereof with scan data to create the scan profiles 14f. In this case, an arrangement wherein a plurality of color components of RGB data are associated with a plurality of color components of L*a*b*, and color deviation compensated for from the association relationships of the two, would be preferred.

Further, whereas the standard color sheets mentioned hereinabove are printed by the printer 20, it would of course be acceptable to use a commercially available color chart or the like to create the scan profiles 14f With such an arrangement, the procedure of printing the standard color sheets can be dispensed with. However, if it is assumed that the scan profiles 14f will be used in calibration of the printer 20, it is sufficient for the gamut of RGB data specified by the scan profiles 14f to encompass the gamut of output color of the printer 20. Thus, in the sense of creating scan profiles 14f for only the minimum necessary gamut, the use of standard color sheets printed with the printer 20 is preferred.

What is claimed is:

1. Image scanning method comprising the steps of:
performing image scanning by scanning a scan target and acquiring scan data that includes tone values for each color component in a plurality of pixels;
acquiring a scan profile indicating association relationships between said tone values and color values, the profile specifying a said association relationship for each of a plurality of scan locations in said image scan; and
for scan data acquired by means of said image scanning, performing color value acquisition by referring to the scan profile corresponding to each scan location and converting said tone values to color values.

2. Image scanning method according to claim 1 wherein a two-dimensional scan target is scanned two-dimensionally.

3. Image scanning method according to claim 1 wherein color of pixels is represented by tone values for each of a plurality of color components in said scan data, and said scan profile associates any of said color components with any of the plurality of color components making up said color values.

4. Image scanning method according to claim 1 wherein said scan profile is created in advance by associating scan data obtained by a plurality of standard color sheets whose color values at each location are known and whose color values differ by means of said image scanning, with said known color values.

5. Color correction method using the image scanning method according to claim 1 to compensate for color deviation in a printing device, the color correction method comprising the steps of:
controlling said printing device, printing a plurality of patches on the basis of image data that differs at each location corresponding said scan locations on a printing medium; and
scanning the printed patches by means of said image scanning method to acquire color values of the patches, and generating correction data for the purpose of compensating for discrepancy between color indicated by said image data, and said acquired color values.

6. Color correction method according to claim 5 wherein color of pixels is represented by tone values for each of a plurality of color components in said scan data, said scan profile associates any of said color components with any of the plurality of color components making up said color values, and said image data is data for printing a plurality of patches using in monochrome each ink that is useable by said printing method, while varying in stepwise fashion the ink usage level of each color.

7. Printing control method for executing printing with reference to correction data created according to claim 5, the printing control method comprising the steps of:
acquiring image data in which color of each pixel in an image targeted for printing is represented in a predetermined color system;
on the basis of a predetermined color conversion rule determined for a standard printing device converting the color system of said acquired image data to an ink color system representing pixel color by means of tone of each ink color as well as performing correction of said conversion results based on said correction data; and
carrying out printing by specifying ink usage level by means of tone of each ink color after conversion and causing said printing device to form an image.

8. Image scanning device comprising:
an image scanning portion that scans a scan target and acquires scan data including tone values for each color component in a plurality of pixels;
a scan profile acquisition portion that acquires a scan profile indicating association relationships between said tone values and color values, the profile specifying a said association relationship for each of a plurality of scan locations in said image scanning portion; and
a color value acquisition portion that, for scan data acquired by means of said image scanning portion, refers to the scan profile corresponding to each scan location and converting said tone values to color values.

9. Color correction device that using the image scanning device according to claim 8 compensates for color deviation in a printing device, the color correction device comprising:
a patch printing portion that, controlling said printing device, prints a plurality of patches on the basis of image data that differs at each location corresponding said scan locations on a printing medium; and
a correction data generating portion that scans the printed patches by means of said image scanning method to acquire color values of the patches, and generates correction data for the purpose of compensating for discrepancy between color indicated by said image data, and said acquired color values.

10. Printing control device that executes printing with reference to correction data created according to claim 8, the printing control device comprising:

an image data acquisition portion that acquires image data in which color of each pixel in an image targeted for printing is represented in a predetermined color system;

a color conversion portion that on the basis of a predetermined color conversion rule determined for a standard printing device converts the color system of said acquired image data to an ink color system representing pixel color by means of tone of each ink color as well as performing correction of said conversion results based on said correction data; and a printing portion that specifies ink usage level by means of tone of each ink color after conversion and causes said printing device to form an image.

11. Image scanning program product implemented on a computer readable medium, comprising: image scanning program code that scans a scan target and acquires scan data including tone values for each color component in a plurality of pixels; scan profile acquisition program code that acquires a scan profile indicating association relationships between said tone values and color values, the profile specifying a said association relationship for each of a plurality of scan locations in said image scanning program code; and color value acquisition program code that, for scan data acquired by means of said image scanning program code, refers to the scan profile corresponding to each scan location and converts said tone values to color values.

12. Color correction program product that using the scan results of the image scanning program product according to claim 11 compensates for color deviation in a printing device, comprising:

patch printing program code that, controlling said printing device, prints a plurality of patches on the basis of image data that differs at each location corresponding said scan locations on a printing medium; and correction data generating program code that utilizing said image scanning program product acquires color values of said printed patches, and generates correction data for the purpose of compensating for discrepancy between color indicated by said image data, and said acquired color values.

13. Printing control program product that executes printing with reference to correction data created according to claim 11, comprising:

image data acquisition program code that acquires image data in which color of each pixel in an image targeted for printing is represented in a predetermined color system;

color conversion program code that on the basis of a predetermined color conversion rule determined for a standard printing device converts the color system of said acquired image data to an ink color system representing pixel color by means of tone of each ink color as well as performing correction of said conversion results based on said correction data; and printing program code that specifies ink usage level by means of tone of each ink color after conversion and causes said printing device to form an image.

* * * * *